Oct. 31, 1961   F. TONNE   3,006,575
PNEUMATIC DISPATCH CARRIER
Filed May 21, 1959
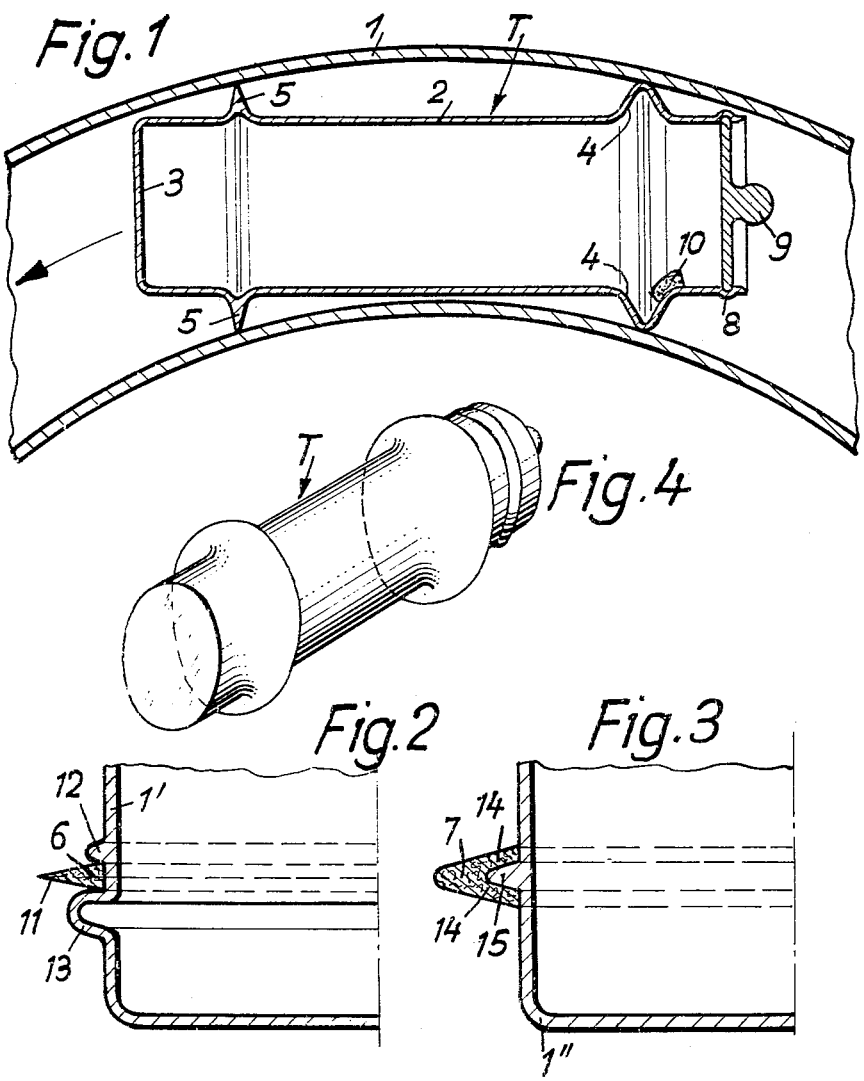
INVENTOR.
Friedrich Tonne
BY
Patent Agent

United States Patent Office 3,006,575
Patented Oct. 31, 1961

3,006,575
PNEUMATIC DISPATCH CARRIER
Friedrich Tonne, Robert-Haug-Weg 11,
Stuttgart, Germany
Filed May 21, 1959, Ser. No. 814,895
Claims priority, application Germany May 28, 1958
2 Claims. (Cl. 243—35)

The present invention relates to a pneumatic dispatch carrier or receptacle for use in pneumatic tube systems for transporting letters, documents, and the like papers. Such pneumatic carriers have heretofore been made in form of metal sleeves provided at both ends thereof with sealing rings, usually of felt. These known pneumatic carriers are relatively heavy and are expensive in production. Moreover, they require relatively great radii of curvature in the conveying tube system. In addition thereto, these heretofore known dispatch carriers have the further drawback that the contents of the metallic carriers can be ascertained only under certain difficulties even if the dispatch carrier is provided with recesses such as a perforation.

In order to overcome this difficulty, it has been suggested to provide such metallic dispatch carriers with windows, but this suggestion has not been adopted in practice.

It is, therefore, an object of the present invention to provide an improved pneumatic dispatch carrier or dispatch receptacle which will overcome the above mentioned drawbacks.

It is another object of this invention to provide a pneumatic dispatch carrier which, while being considerably lighter than the heretofore known metallic dispatch carriers will make it possible to use a conveying pipe system with considerably less large radii of curvature without, however, necessitating a reduction in the length of the dispatch carrier.

It is a further object of this invention to provide a dispatch carrier of the type set forth in the preceding paragraphs, which will permit an easy ascertainment of the contents in the respective dispatch carrier.

These and other objects and advantages of the invention will appear more clearly from the following specification in connection with the accompanying drawing, in which:

FIG. 1 illustrates a section through a portion of a curved conveying tube and a dispatch carrier according to the invention in said conveying tube.

FIGS. 2 and 3 represent portions of a dispatch carrier according to the invention with sealing means slightly differing from those shown in the dispatch carrier of FIG. 1.

FIG. 4 is a perspective view of a dispatch carrier according to the invention.

The dispatch carrier according to the present invention is characterized primarily in that the carrier including the bottom thereof is made of light transparent synthetic material and may be produced by thermoplastic molding, for instance by blowing or injection. As synthetic material for this purpose materials may be employed such as polyethylene, nylon or polypropylene.

The sealing rings necessary for obtaining a seal between the dispatch carriers and the conveying tube may be molded directly onto the carrier so as to form an integral part thereof.

According to a further advantage of the present invention, the sealing means are preferably not arranged at the ends of the carrier but somewhat spaced therefrom. In this way, shorter radii of curvature of the conveying tube system can be employed without affecting the overall length of the dispatch carrier. Due to the transparency of the entire carrier including the bottom, the contents of the carrier will easily be visible from the outside even if the tubes are stacked.

Referring now to the drawing in detail, the dispatch carrier of the present invention generally designated with the latter T comprises a tubular section 2 of round, oval, or other convenient shape and a bottom 3 integral therewith. The tubular section 2 as well as the bottom 3 are made of transparent synthetic material such as the material set forth above. The seal between the carrier and the conveying pipe is formed by a bead-like or bulged-out portion 4 of the tubular section 2 and a lip-like section 5. It is, of course, to be understood that the portions 4 and 5 may be of the same shape. It is also possible that the dispatch carrier is provided near one end only with a bulged-out or lip portion. As will be evident from FIG. 1, the bulged-out or lip portions are somewhat spaced from the ends of the carrier. Such an arrangement permits a better exploitation of the conveying tube system inasmuch as the radii of curvature of the conveying pipes can be shorter without affecting the length of the dispatch carrier as is clearly shown in FIG. 1.

In the specific example shown in FIG. 1 of the drawing, the seal 5 is so designed that it tapers radially into a line thereby reducing the frictional resistance. Preferably, the seal 5 is made elastically flexible so that it will be able to adapt itself to the curvature in the conveying tube system, particularly when strong curvatures are encountered.

FIG. 2 shows a slight modification of the dispatch carrier over the dispatch carrier shown in FIG. 1 inasmuch as the seal 11 forms a separate part of the carrier proper 1' and is slipped over carrier 1' and located in a groove 6 flanked by beads 12 and 13.

FIG. 3 shows a portion of a dispatch carrier 1" which similar to carrier 1' has a seal 7 slipped over it. In contrast to the arrangement of FIG. 2, however, seal 7 is provided with legs 14 straddling the sides of a thin flange 15.

Referring back to FIG. 1, it will be seen that the dispatch carrier T is near one end thereof provided with an annular groove 8 for receiving a lid 9 which is snapped into said groove and closes the dispatch carrier. In order to be able to prevent the contents of carrier T from dropping out when the carrier is open, a slide protection 10 is provided in the interior of the carrier which slide protection may consist for instance of foam rubber or other rubber material.

It is, of course, to be understood that the present invention is, by no means, limited to the particular constructions shown in the drawing but also comprises any modifications within the scope of the appended claims.

What I claim is:

1. As an article of manufacture: a pneumatic dispatch carrier having a bottom and a tubular wall, said bottom and said wall consisting of a single piece of thermoplastic synthetic material, said annular wall having two outwardly protruding annular beads confining with said wall and with each other an annular groove, and an elastic annular seal located and firmly held between said beads and protruding outwardly from said tubular wall in radial direction thereof and tapering in outward direction.

2. A pneumatic dispatch carrier according to claim 1, in which the bottom and tubular wall of the pneumatic dispatch carrier is of transparent thermoplastic synthetic material.

References Cited in the file of this patent

UNITED STATES PATENTS

| | | |
|---|---|---|
| 669,890 | Bogardus | Mar. 12, 1901 |
| 1,185,489 | Emerson | May 30, 1916 |
| 1,745,786 | Drenkard | Feb. 4, 1930 |
| 2,031,988 | Tobelman | Feb. 25, 1936 |
| 2,768,667 | Hill | Oct. 30, 1956 |
| 2,880,859 | Tupper | Apr. 7, 1959 |